United States Patent
Demissy et al.

(10) Patent No.: US 7,505,654 B2
(45) Date of Patent: Mar. 17, 2009

(54) CONNECTOR FOR OPTIC FIBRES

(76) Inventors: Daniel Demissy, 196-A, Montee Henrysburg, St.-Bernard-de-Lacolle, Québec (CA) J0J 1V0; Eric Weynant, 1175, Avenue Decharme, App. #101, Montréal, Québec (CA) H2V 1E2

( * ) Notice: Subject to any disclaimer, the term of this patent is extended or adjusted under 35 U.S.C. 154(b) by 0 days.

(21) Appl. No.: 11/381,567

(22) Filed: May 4, 2006

(65) Prior Publication Data
US 2006/0193564 A1    Aug. 31, 2006

Related U.S. Application Data

(63) Continuation of application No. 10/505,556, filed as application No. PCT/CA03/00232 on Feb. 21, 2003, now Pat. No. 7,066,656.

(60) Provisional application No. 60/358,392, filed on Feb. 22, 2002.

(51) Int. Cl.
G02B 6/26     (2006.01)
G02B 6/36     (2006.01)
G02B 6/38     (2006.01)

(52) U.S. Cl. .............................. 385/52; 385/60; 385/72; 385/78; 385/55; 385/84

(58) Field of Classification Search ................. 385/54, 385/60, 62, 67, 68, 84, 52; 148/402
See application file for complete search history.

(56) References Cited

U.S. PATENT DOCUMENTS

| | | | |
|---|---|---|---|
| 4,261,644 A * | 4/1981 | Giannaris | 385/99 |
| 4,461,537 A * | 7/1984 | Raymer et al. | 385/88 |
| 4,743,084 A | 5/1988 | Manning | |
| 4,921,323 A | 5/1990 | Delahanty et al. | |
| 4,934,785 A | 6/1990 | Mathis et al. | |
| 4,964,689 A | 10/1990 | Wichansky | |
| 5,005,940 A | 4/1991 | Modrey | |
| 5,337,390 A | 8/1994 | Henson et al. | |
| 5,390,270 A | 2/1995 | Hanzawa et al. | |
| 5,703,982 A | 12/1997 | Takizawa | |
| 5,857,046 A | 1/1999 | Barkus et al. | |
| 6,357,933 B1 | 3/2002 | Bradley et al. | |
| 6,409,393 B1 | 6/2002 | Grois et al. | |

(Continued)

FOREIGN PATENT DOCUMENTS

DE           3308679           9/1984

(Continued)

*Primary Examiner*—Charlie Peng
(74) *Attorney, Agent, or Firm*—Bereskin & Parr (57) ABSTRACT

There is provided a mechanical connector for mechanically connecting and optically coupling two optical fiber ends, the connector comprising a longitudinal body, and a fiber conduit in the body for holding the two fiber ends and confining the fibers to be in end to end alignment in the conduit with sufficient inward radial pressure exerted from the conduit on each one of the fiber ends to ensure centering within the fiber conduit to provide the optical coupling without risking damage to a silica core of the fiber ends. The connector is adapted to controllably release the pressure on the fibers to allow for insertion of the fibers in the conduit, and the connector holds the fiber ends in the optical coupling without adhesive. There is further provided a method for mechanically connecting and optically coupling two optical fiber ends.

7 Claims, 9 Drawing Sheets

U.S. PATENT DOCUMENTS

| | | |
|---|---|---|
| 6,550,978 B2 | 4/2003 | De Marchi |
| 6,773,167 B2 | 8/2004 | Scanzillo |
| 2001/0002220 A1 | 5/2001 | Throckmorton et al. |
| 2003/0044124 A1 | 3/2003 | Saitoh |
| 2003/0059169 A1 | 3/2003 | Watanabe et al. |
| 2003/0059170 A1 | 3/2003 | Shouji et al. |

FOREIGN PATENT DOCUMENTS

| | | | |
|---|---|---|---|
| DE | 19629510 | | 1/1997 |
| EP | 0590586 | | 4/1994 |
| JP | 63-202702 | * | 8/1988 |
| JP | 20040006507 | | 1/2004 |
| WO | 9321547 | | 10/1993 |
| WO | 2005040876 | | 5/2005 |

\* cited by examiner

CONNECTOR FOR OPTIC FIBRES

FIELD OF THE INVENTION

The present invention relates to a connector for optic fibres.

BACKGROUND OF THE INVENTION

In an optic fibre, an optical signal can be transmitted through the fibre, carrying relatively large amounts of information as compared to a typical copper wire. However, the signal is susceptible to distortion or to a loss of strength if the connection between the ends of two optic fibres is poor. Thus, several different approaches have been proposed for connections that provide good signal conduction.

One approach is to fuse the ends of the optic fibres together. This ensures that the ends remain in abutment, however several problems exist with fusion. The optic fibres are often doped with a secondary material that enhances certain desired properties. The act of fusion typically destroys the doping in the ends of the optic fibres, thereby reducing the connection's capacity to transmit a signal. Furthermore, fusing can usually only be used with pairs of optic fibres that are doped with the same secondary material.

Other approaches include a ferrule that receives the two ends of the optic fibres. The ferrule has a conduit that is oversized so that the optic fibres are easily inserted therein. Glue may be placed in the ferrule to help hold the optic fibres together. A problem with this approach is that the ends of the optic fibres are not in certain abutment, because of the oversizing of the aperture in the ferrule and thus, the signals may be comprimised. The ferrule may be mechanically reduced in size by crimping for example, so that it constrains the optic fibres mechanically. This approach however, can easily damage the optic fibres, which are typically fragile.

Thus, a continuing need exists for an improved connector for connecting optic fibres that is simple to use and that maintains good signal conduction between the optic fibres.

SUMMARY OF THE INVENTION

In a first aspect the invention is directed to a connector for connecting optic fibres. The connector includes a body. The body has a first end and a second end, and a fibre conduit extending from the first end to the second end. The body is divided into a plurality of fingers that extend longitudinally at each end.

BRIEF DESCRIPTION OF THE DRAWINGS

Reference will now be made by way of example to the accompanying drawings, showing articles made according to preferred embodiments of the present invention. In the drawings.

DETAILED DESCRIPTION OF THE INVENTION

Figure 1:
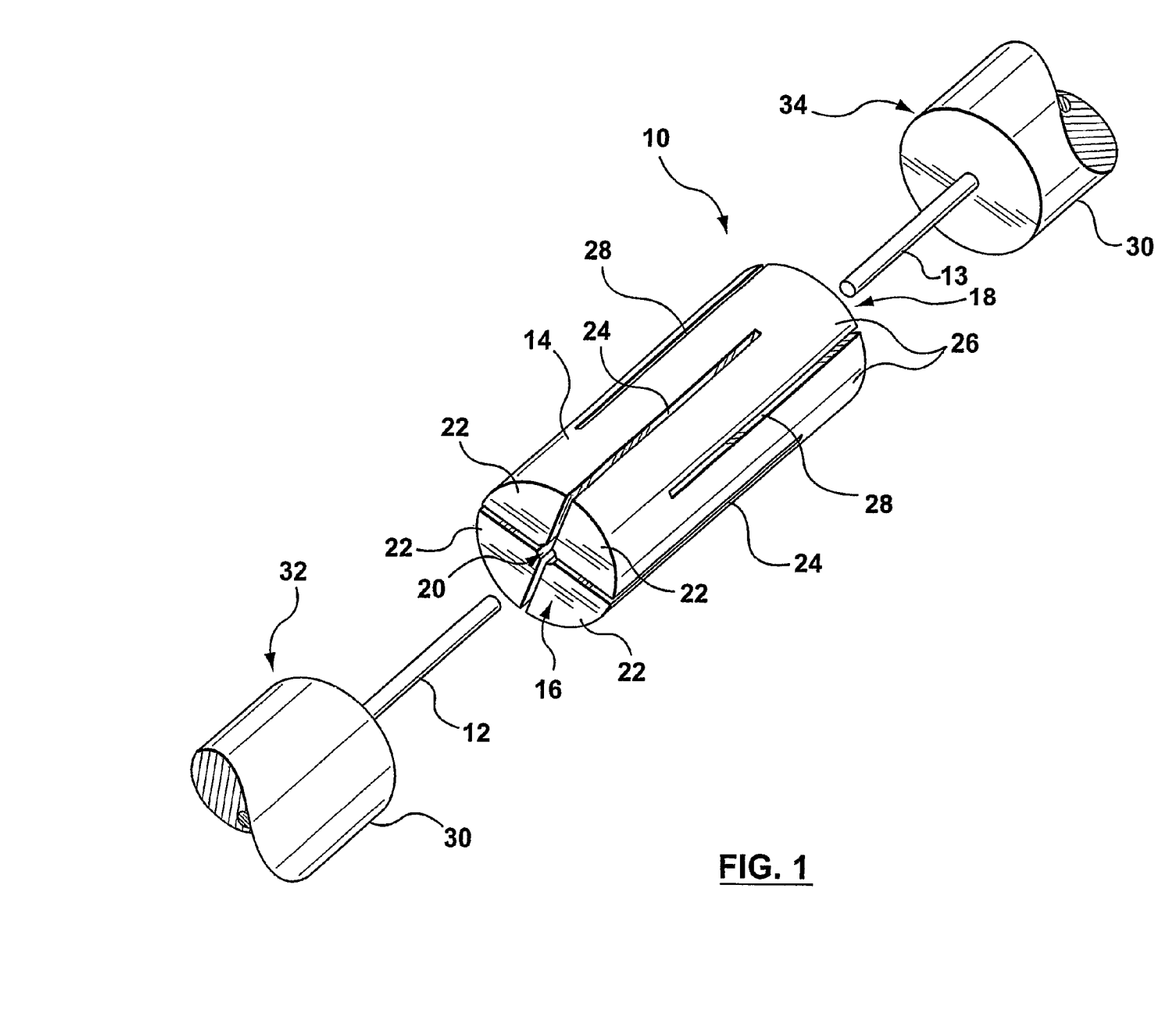
FIG. 1 is a perspective view of the connector in accordance with a first embodiment of the present invention, with two optic fibres.
Figure 2:
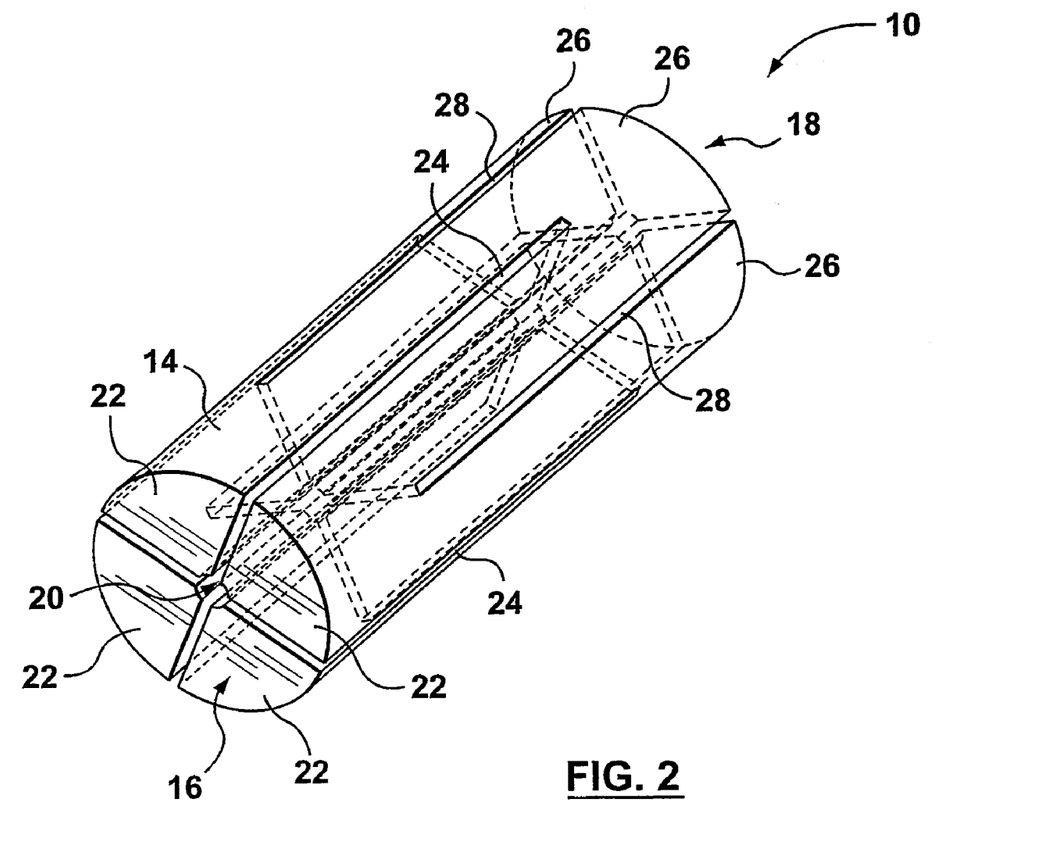
FIG. 2 is a transparent perspective view of the connector shown in FIG. 1.
Figure 3:
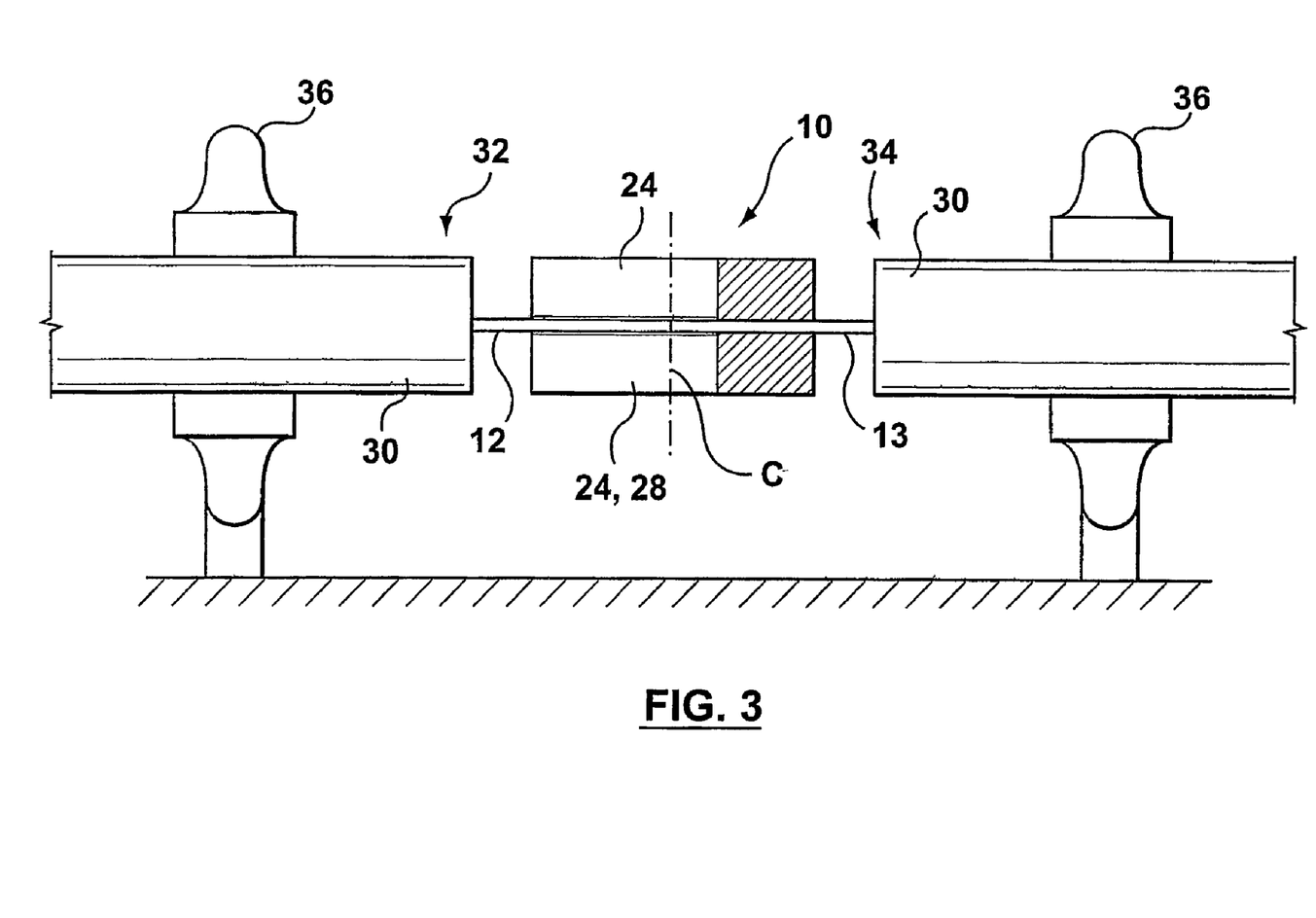
FIG. 3 is a side sectional view of the connector with both optic fibres inserted therein.

Reference is made to FIGS. 1, 2 and 3, which show a connector 10 in accordance with a first embodiment of the present invention. Connector 10 is used to connect the ends of first and second optic fibres 12 and 13 (see FIG. 3), so that the optic fibres 12 and 13 can transmit optical signals across the connection. The connector 10 has a body 14, which may be generally cylindrical. The body 14 has a first end 16 and a second end 18.

A fibre conduit 20 extends from the first end 16 to the second end 18. The fibre conduit 20 is used to hold the two ends of the optic fibres 12 and 13 in abutment, so that they can transmit optical signals therebetween. The fibre conduit 20 is sized so that the connector 10 applies a small amount of compressive force on the ends of the optic fibres 12 and 13, to hold the fibres 12 and 13 in abutment with each other when they are inserted into the connector 10. It will be appreciated that the compressive force that is applied to the optic fibres 12 and 13 must be suitably small, so as not to damage or break the fibres 12 and 13.

The body 14 is divided into a plurality of first fingers 22, that extend from the first end 16 towards the second end 18. The first fingers 22 hold the first optic fibre 12 in place in the connector 10, when the optic fibre 12 is inserted into the connector 10. By configuring the first fingers 22 to have a selected length, the compressive force of the connector 10 on the optic fibres 12 and 13 can be controlled and can be varied over the length of the connector body 14. The connector body 14 may be divided into any suitable number of first fingers 22, such as, for example, four first fingers 22. Alternatively, the connector 10 may have more or fewer first fingers 22, such as, three or five first fingers. The first fingers 22 may occupy any suitable portion of the circumference of the body 14. For example, the first fingers 22 may each occupy approximately 90° of the circumference. The first fingers 22 may be formed by any suitable method, such as by milling axially-extending slots 24 into the first end 16, as shown more clearly in FIG. 2.

Referring again to FIG. 1, the body 14 may have a plurality of second fingers 26 that extend from the second end 18 towards the first end 16. The second fingers 26 hold the second optic fibre 13 in place in the connector 10, when the second optic fibre 13 is inserted into the connector 10. The second fingers 26 may be similar in size, length and number to the first fingers 22. Alternatively, the second fingers 26 may be configured differently than the first fingers 22, to suit the mechanical properties of the second optic fibre 13. Thus, the second fingers 26 may be shorter or longer than the first fingers 22, or may be different in number than the first fingers 22. The second fingers 26 may be formed by any suitable method, such as by milling axially-extending slots 28 into the second end 18, as shown more clearly in FIG. 2.

Referring again to FIG. 1, the first and second fingers 22 and 26 may be circumferentially offset from each other, as shown in FIG. 1. The offset angle may be any suitable angle, such as, for example, 45°.

Furthermore, the fingers 22 and 26 may extend along the connector body 14 far enough from their respective ends so that they overlap with each other along a portion of the connector body 14. The overlap permits further control over the compressive force exerted by the connector body 14 on the optic fibres 12 and 13, particularly at the point where the first and second optic fibres 12 and 13 abut each other.

The connector 10 may be made from a material that has a shape memory. In other words the material, when deformed from its rest condition by any suitable means, is biased to return to its rest condition when the cause of deformation is removed. An example of such a material is any material that deforms within its elastic limit under mechanical deformation. Another example is any material that expands suitably due to a temperature increase, and then returns to its initial rest condition when the temperature is reduced to the initial temperature.

The connector 10 may be made from any of several different materials, depending on the particular environment in which the connector is used, and depending on the particular jurisdictional code that may govern the construction and use of the connector 10. The connector 10 may, for example, be made from a polymeric material, such as isostatic 1 polybutene, piezoelectric ceramics, copper alloys including binary and ternary alloys, such as Copper—Aluminum alloys, Copper—Zinc alloys, Copper—Aluminum—Beryllium alloys, Copper—Aluminum—Zinc—alloys and Copper—Aluminum—Nickel alloys, Nickel alloys such as Nickel—Titanium—Iron alloys and Nickel—Titanium—Colbalt alloys, Iron alloys such as Iron—Manganese alloys, Iron—Manganese—Silicon alloys, Iron—Chromium—Manganese alloys and Iron—Chromium—Silicon alloys, Aluminum alloys, and high elasticity composites which may optionally have metallic or polymeric reinforcement.

To connect the two optic fibres 12 and 13, the fibre conduit 20 is enlarged by deforming the connector 10 in any suitable way. For example, the connector 10 may be heated to a sufficient temperature so that the connector 10 undergoes sufficient thermal expansion for the optic fibres 12 and 13 to be inserted into the fibre conduit 20. The amount of heating required and the final require temperature for the connector 10 is dependent on the material of manufacture for the connector 10.

A gel that has substantially the same index of refraction as the optic fibres 12 and 13 may be inserted into the fibre conduit 20. The gel provides uniform optical properties across the connection between the optic fibres 12 and 13, to reduce a loss of the signal due to internal reflection and refraction of the optical signals at the ends of the optic fibres 12 and 13.

The optic fibres 12 and 13 are typically covered in a sheath 30, which, among other things, protects the optic fibres 12 and 13 from mechanical damage during installation and use. The combination of the sheath 30 and the optic fibre 12 or 13 makes up a cable 32 or 34 respectively. The sheath 30 on the ends of the optic fibres 12 and 13 is removed, exposing the optic fibres 12 and 13.

The optic fibres 12 and 13 are inserted into the heated connector 10. As they are inserted, the optic fibres 12 and 13 displace excess gel that is in the fibre conduit 20. The displaced gel can escape from the connector 10 through the slots 24 and 28.

Once the optic fibres 12 and 13 are fully inserted into the heated connector 10, their respective ends abut each other. The connector 10 may then be cooled, so that it returns to its initial size. Once the connector 10 returns to its original size, the fingers 22 and 26, and the body 14 in general exerts a controlled compressive force on the optic fibres 12 and 13, that is large enough to retain the optic fibres 12 and 13 in abutment with each other, but is small enough so that the optic fibres 12 and 13 are not damaged by the compression.

During the step wherein the connector 10 returns to its rest condition, there may be a tendency for the connector 10 to push the ends of the optic fibres 12 and 13 apart slightly. Thus, it may be necessary to hold the fibres 12 and 13 in a fixed position during the step where the connector returns to its original size to prevent the optic fibres 12 and 13 from being moved apart. For example, the sheath 30 covering each optic fibre 12 and 13 may be fixedly clamped by fixedly positioned clamps 36, as shown in FIG. 3, so that axial movement of the optic fibres 12 and 13 is not permitted. By clamping the sheath 30, the risk is reduced of damaging the optic fibres 12 and 13.

Figure 4:
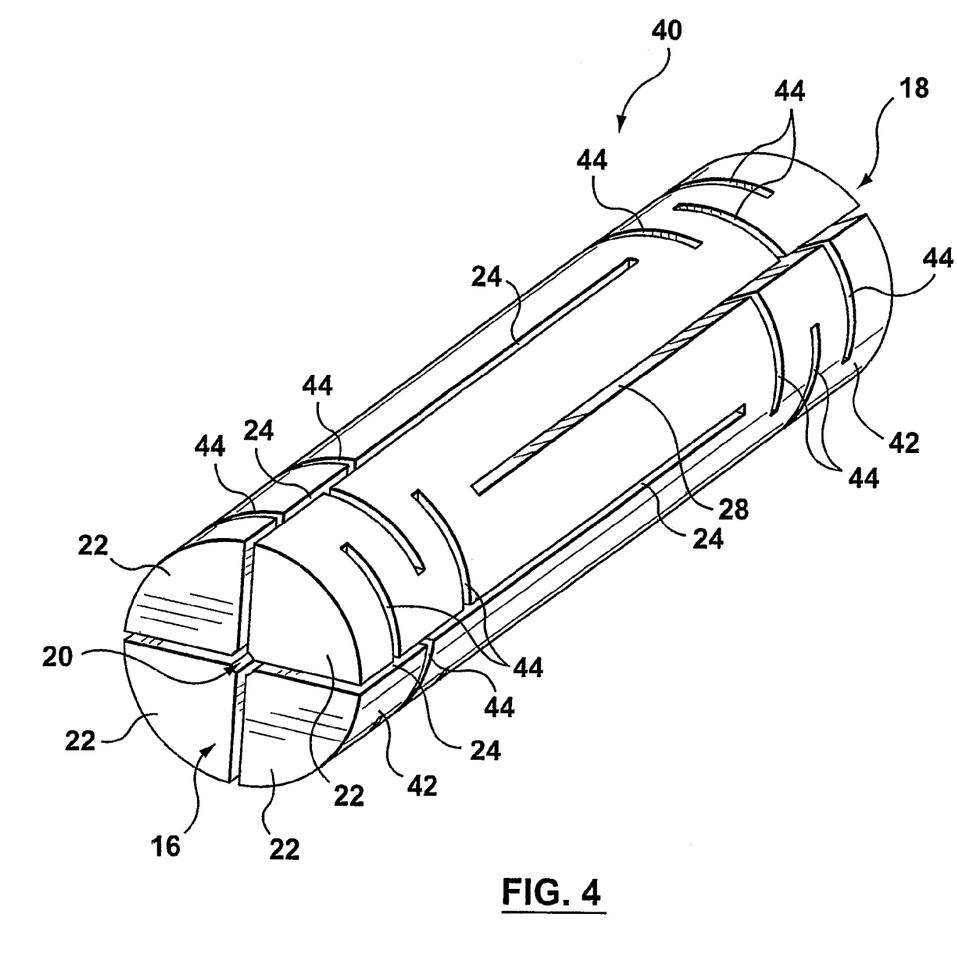
FIG. 4 is a perspective view of a connector in accordance with a second embodiment of the present invention.

Reference is made to FIG. 4, which shows a connector 40, in accordance with a second embodiment of the present invention. The connector 40 is similar to connector 10 except that connector 40 includes an accordion portion 42 that extends along some or all of the length of each finger 22, 26. The accordion portion 42 may extend from the free end of each finger 22, 26 as shown in FIG. 4. The accordion portion 42 causes optic fibres 12 and 13 to be retained in abutment with each other while the connector 40 returns to its initial rest condition from a deformed condition.

Figure 6A:
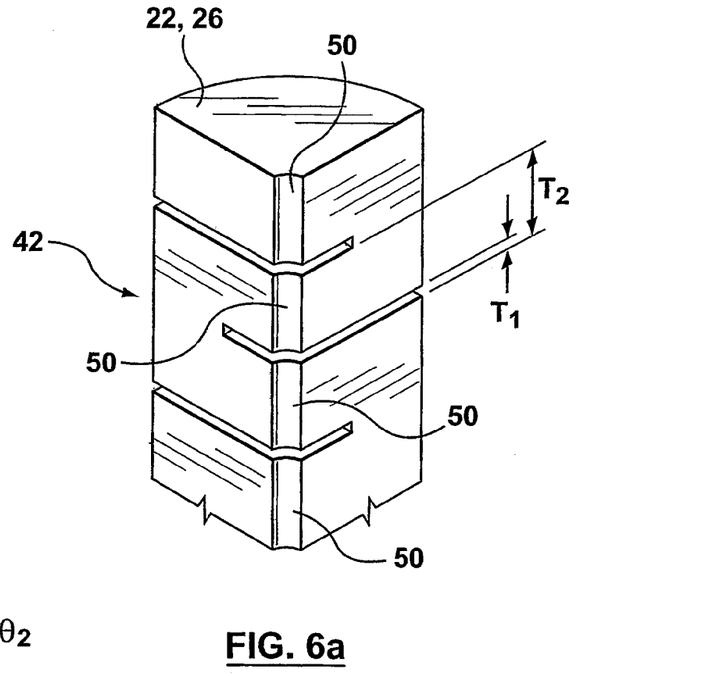
FIG. 6a is a perspective view of one of the fingers of the connector shown in FIG. 4 in the rest position.

For each first finger 22, the accordion portion 42 may be created by milling a plurality of transverse slots 44 into each finger 22. The slots 44 may be milled into each finger 22 so that they extend transversely alternately from each circumferential edge of each finger 22. Referring to FIG. 6a, the slots 44 each have a thickness T1 and they define a plurality of transverse accordion fingers 46, each of which has a thickness T2. The thickness T1 of the slots 44 and the thickness T2 of the accordion fingers, along with the material of manufacture of the connector 40, may be selected to provide a desired elasticity and deformability to the fingers 22, for a given mechanical load. The slots 44 define accordion fingers 46.

Figure 5:
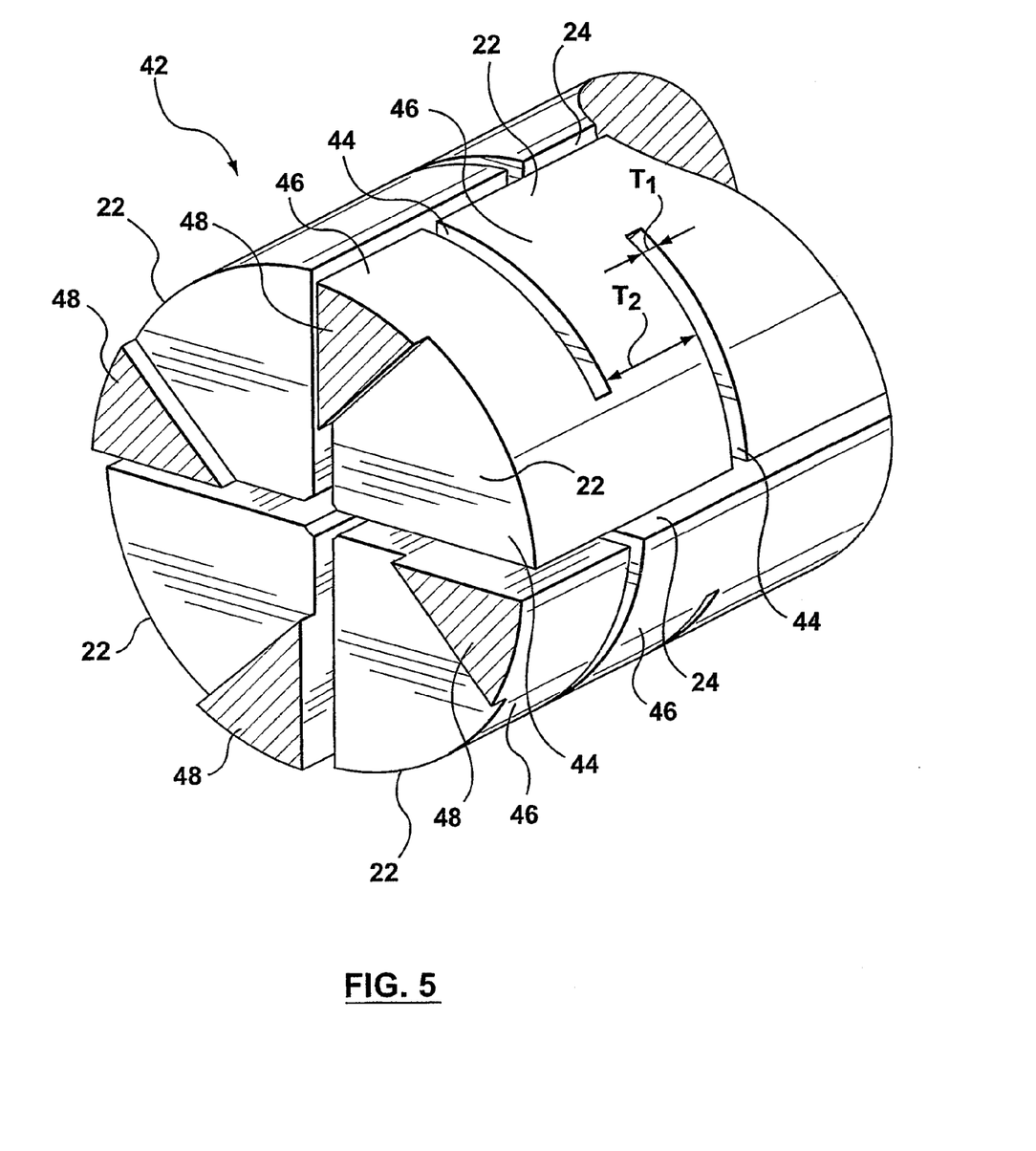
FIG. 5 is a perspective sectional view of a portion of the connector shown in FIG. 4.

The slots 44 are shown more clearly in FIG. 5. Each slot 44 is milled only partially through the fingers 22, so that a portion 48 is left unmilled. The portion 48 is a joining portion, which joins adjacent accordion fingers 46. The joining portion 48 may have any suitable shape. For example, the joining portion 48 may be generally wedge-shaped, and may extend only partially through the radial depth of its associated finger 22. This wedge shape has been found to be advantageous during the deformation and reformation of the accordion portions 42.

The accordion portions 42 on the fingers 26 may be similar to those on the fingers 22. The accordion portions 42 on the fingers 26 may be created by milled slots 44 which alternately extend from each circumferential side of each finger 26. The thickness T1 of the slots 44 and the thickness T2 of the transverse accordion fingers 46 on the fingers 26 may be the same or different from those on the fingers 22, depending on the mechanical properties of the optic fibre 13.

Figure 6B:
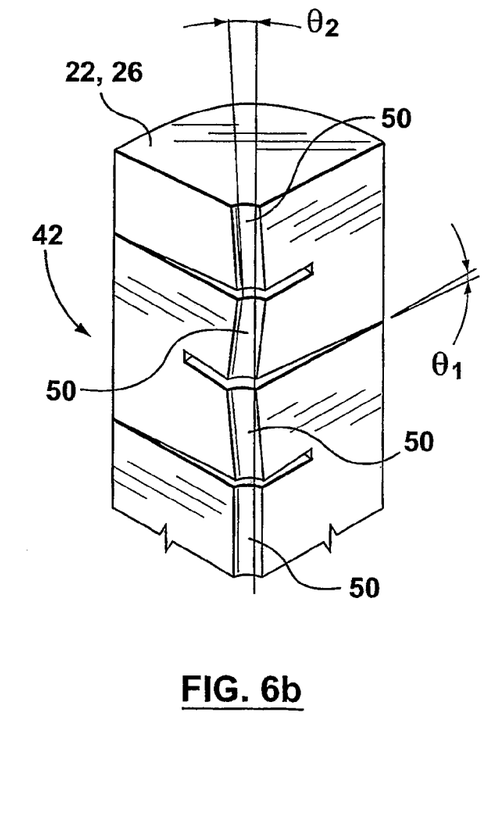
FIG. 6b is a perspective view of the finger shown in FIG. 6a, in the flexed position.

Reference is made to FIG. 6b, which shows one of the fingers 22, 26 in a deformed condition. In the deformed condition, the accordion portion 42 is compressed. As shown, in the deformed condition the normally parallel accordion fingers 46 contact each other, and the normally parallel side edges of the slots 44 form an angle $\Theta 1$. The thickness T1 of the slots 44 determines the maximum angle Θ1 for the accordion fingers 46. These parameters are set based on the elastic stress limit of the material of manufacture for the connector 40 and based on the requirements of the particular installation, such as the environment in which the connector will be used.

In the deformed condition, the accordion portion 42 distorts the fibre conduit 20, so that the fibre conduit 20 is divided into a plurality of segments 50 that are each at an angle Θ2 with the longitudinal axis of the connector 40. Because the segments 50 are kinked with respect to one another in the deformed condition, an optic fibre that is inserted into the fibre conduit 20 is gripped firmly therein by the kinked segments 50. The configuration of the accordion portion 42 may be selected to provide any suitable angle Θ2 so that the optic fibre 12 or 13 is gripped firmly without being damaged. The gripping action of the accordion portion 42 prevents the optic fibres 12 and 13 from being pulled apart slightly when the connector returns from a thermally expanded condition, for example, to its original rest condition, as shown in FIG. 6*a*. By gripping the optic fibre 12 or 13 with the accordion portion when the connector 40 is in the deformed condition, it is therefore unnecessary to clamp the sheath 30 of the cable 32 or 34, as may be required using connector 10.

Figure 7:
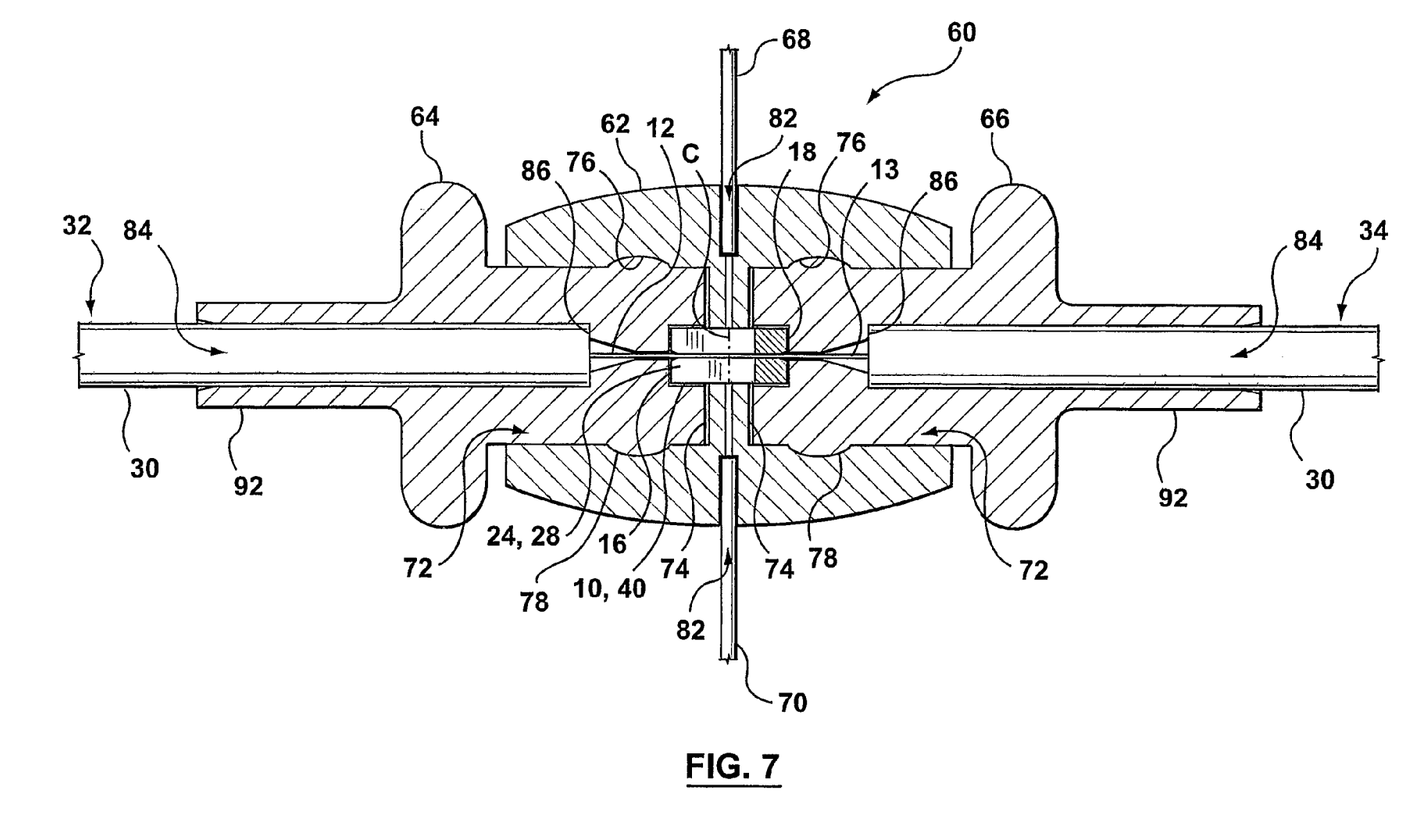
FIG. 7 is a sectional view of a connector assembly incorporating one of the connectors shown in FIG. 1 or FIG. 4.

Reference is made to FIG. 7, which shows a connector assembly 60, which is used to connect the optic fibres 12 and 13 and which incorporates connector 10 or connector 40. The connector assembly 60 also includes a central sheath 62, first and second end members 64 and 66, and may include a signal transmitter 68, and a signal receiver 70.

Figure 8:
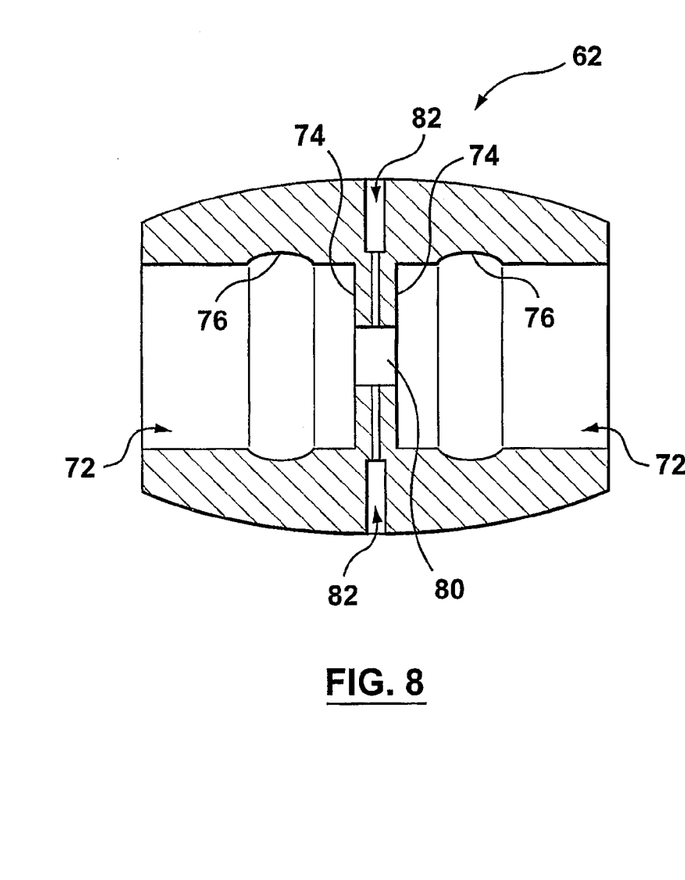
FIG. 8 is a sectional view of a central sheath of the connector assembly shown in FIG. 7.

The central sheath 62 is shown more clearly in FIG. 8. The central sheath 62 may be generally tubular and may have an aperture 72 at each end. Each aperture 72 is sized for receiving and holding a portion of one of the end members 64 and 66 (see FIG. 7). Each aperture 72 may end at an internal shoulder 74, which provides an abutment surface for the ends of one of the end members 64 and 66. Each aperture 72 may include a circumferential channel 76, which mates with a circumferential boss 78 on each of the end members 64 and 66.

A pass-through 80 extends between the shoulders 74 to connect the two apertures 72. The pass-through 80 is sized to fixedly retain one of the connectors 10 or 40 in place therein, so that one of the ends 16 and 18 of the connector 10, 40 extends into each of the apertures 72 (see FIG. 7).

A pair of radial apertures 82 may extend through the central sheath 62 on a line that is at the longitudinal center of the central sheath 62. The radial apertures 82 extend from the outer surface of the central sheath 62 to the pass-through 80, on opposing points on the circumference of the central sheath 62. The signal transmitter 68 and the signal receiver 70 may extend into the radial apertures 82 (see FIG. 7). The signal transmitter 68 may be, for example an optic fibre that transmits a light beam. The signal receiver 70 may be any suitable type of receiver, such as another optic fibre, which is adapted to receive signals from the transmitter 68. The receiver 70 may be connectable to amplification means or a suitable processing means (not shown), for determining whether the signal is being received.

Referring to FIG. 7, the connector 10, 40 may be positioned in the pass-through 80 so that the longitudinal center of the connector 10, 40, which is shown at C is aligned with the apertures 82. Furthermore, the connector 10, 40 may be oriented so that slots 24 or 28 align with the radial apertures 82, so that the receiver 70 can receive signals from the transmitter 68 through the connector 10, 40. At least one pair of slots 24, 28 may extend from its respective end 16, 18 past the longitudinal center of the connector 10, 40, so that the receiver 70 can 'see' the transmitter 68. Alternatively, the connector 10, 40 may have a transverse pass-through that extends transversely through the connector, along a line at the longitudinal center of the connector 10, 40.

The end members 64 and 66 are positioned in the apertures 72 and extend outward therefrom. The end members 64 and 66 receive the ends of the cables 32 and 34 respectively.

Figure 9:
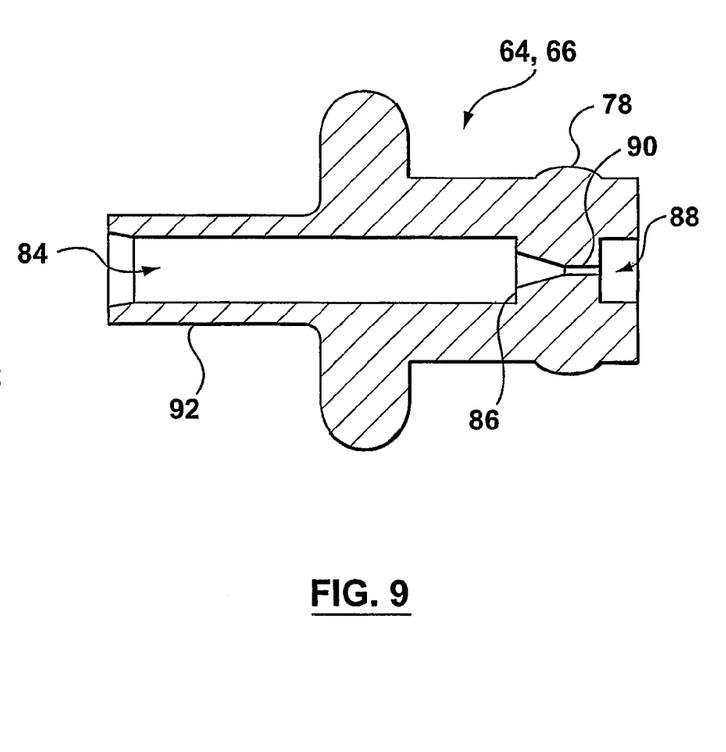
FIG. 9 is a sectional view of an end member of the connector assembly shown in FIG. 7.

The end member 64 or 66 is shown more clearly in FIG. 9. The end member 64 has a sheath-receiving aperture 84 at its outer end. The sheath-receiving aperture 84 receives and retains the sheath 30 of the cable 32. The sheath-receiving aperture 84 has an internal shoulder 86, against which the sheath 30 can abut during the connection process. The outer end of the sheath-receiving aperture 84 may be flared to reduce stresses imparted to the optic fibre 12 during bending of the cable 32 in the portion that extends outward from the end member 64.

The end members 64 each have a connector-receiving aperture 88 in their respective inner ends. The connector-receiving aperture 88 is sized to receive and retain connector 10, 40, and to align the connector 10, 40 and the end member 64 with respect to each other (see FIG. 7).

A pass-through 90 extends between the radial center of the connector-receiving aperture 88 and the radial center of the sheath-receiving aperture 84, permitting the optic fibre 12 to pass-through from the end of the sheath 30 to the connector 10, 40.

End member 66 is similar to end member 64 and is for receiving and retaining the end of cable 34 in the same way that end member 64 receives and retains the end of cable 32.

To connect cables 32 and 34, or more specifically, optic fibres 12 and 13, using the connector assembly 60, the following steps are carried out. The connector assembly 60 may be assembled as one complete unit by any suitable means.

Before using the connector assembly 60, a portion of the sheath 42 surrounding the optic fibres 12 and 13 is removed, exposing a selected length of each of the fibres 12 and 13. The tips of the fibres 12 and 13 are cleaved by any suitable cleaving means, such as a laser, so that the same length of optic fibre is exposed on each cable 12 and 13. Cleaving also ensures that the end faces are generally perpendicular to the longitudinal axis of the optic fibres 12 and 13, so that they mate well together.

The connector assembly 60 may be heated so that the connector 10, 40 expands sufficiently to permit the easy insertion of the optic fibres 12 and 13 therein. The transmitter 68 and receiver 70 are activated, so that a light beam or other suitable signal, for example, is transmitted through the connector and is received at the receiver 70. Gel may be inserted into the fibre conduit 20 of the connector, so that when the optic fibres 12 and 13 are inserted, the gel fills in any gaps at the abutment between them to prevent loss of or distortion of an optical signal being transmitted through the optic fibres. As before, the gel has substantially the same index of refraction as the optic fibres 12 and 13.

The ends of the cables 32 and 34 are then inserted into the sheath receiving apertures 84 in the connector assembly 60, until the ends of the sheaths 30 approach the internal shoulders 86. The pass-throughs 90 guide the ends of the optic fibres 12 and 13 into the fibre conduit 20 of the connector 10, 40. The optic fibres 12 and 13 are micro-advanced in the fibre conduit 20, while verification takes place that the light beam from the transmitter 68 is not broken, and is received by the receiver 70. Any excess gel that is in the fibre conduit 20 is gradually displaced by the advancement of the optic fibres 12 and 13, and can seep out through the slots 24, 28 and possibly through slots 44.

The advancement continues until the light beam is broken, indicating that the optic fibres 12 and 13 are in abutment at the longitudinal center of the connector 10, 40. It will be noted that the slots 24, 28 or any pass-through aperture on the connector 10, 40 for the light beam may be sized large enough to accommodate some degree of off-centeredness in the abutment of the ends of the optic fibres 12 and 13.

Once the abutment is achieved, the connector assembly 60 is cooled, to return the connector 10, 40 to its original size. If connector 10 is used in the assembly 60, then the sheaths 30 of the cables 32 and 34 are clamped to ensure that the optic fibres 12 and 13 are not pushed away from each other during the cooling of the connector assembly 60.

If the connector 40 is used in the assembly 60, then clamping of the sheaths 30 is not required. The connector 40 can be compressed slightly by mechanical or other suitable means, so that the accordion portions 42 grip the optic fibres 12 and 13, while ensuring that the ends of the optic fibres 12 and 13 remain abutted against one another.

Once the connector assembly 60 is cooled, the end members 64 and 66 are fixedly joined to the cables 32 and 34 respectively, for example, by a crimping tool, to crimp a sleeve portion 92 of the end members 62 and 64 to the sheath 30 of the cables 32 and 34.

The connectors 10, 40 in accordance with the present invention, may offer one or more of the following advantages, when used to connect optic fibres. For example, one optional advantage is that the connectors 10, 40 facilitate achieving a tight alignment of two optic fibres, whereby the ends of the fibres are aligned with each other and are held in centred, face-to-face abutment with each other. Another optional advantage is that the connectors 10, 40 of the present invention maintain a compressive force pushing the optic fibres towards each other. This reduces the air gap between the ends of the fibres, which can occur with other joining means of the prior art. Yet another optional advantage of the connectors 10, 40 is that they exert a clamping force at each end to firmly hold the fibres together. In particular, the connector 40 can produce a greater clamping force than the connector 10.

Figure 10:
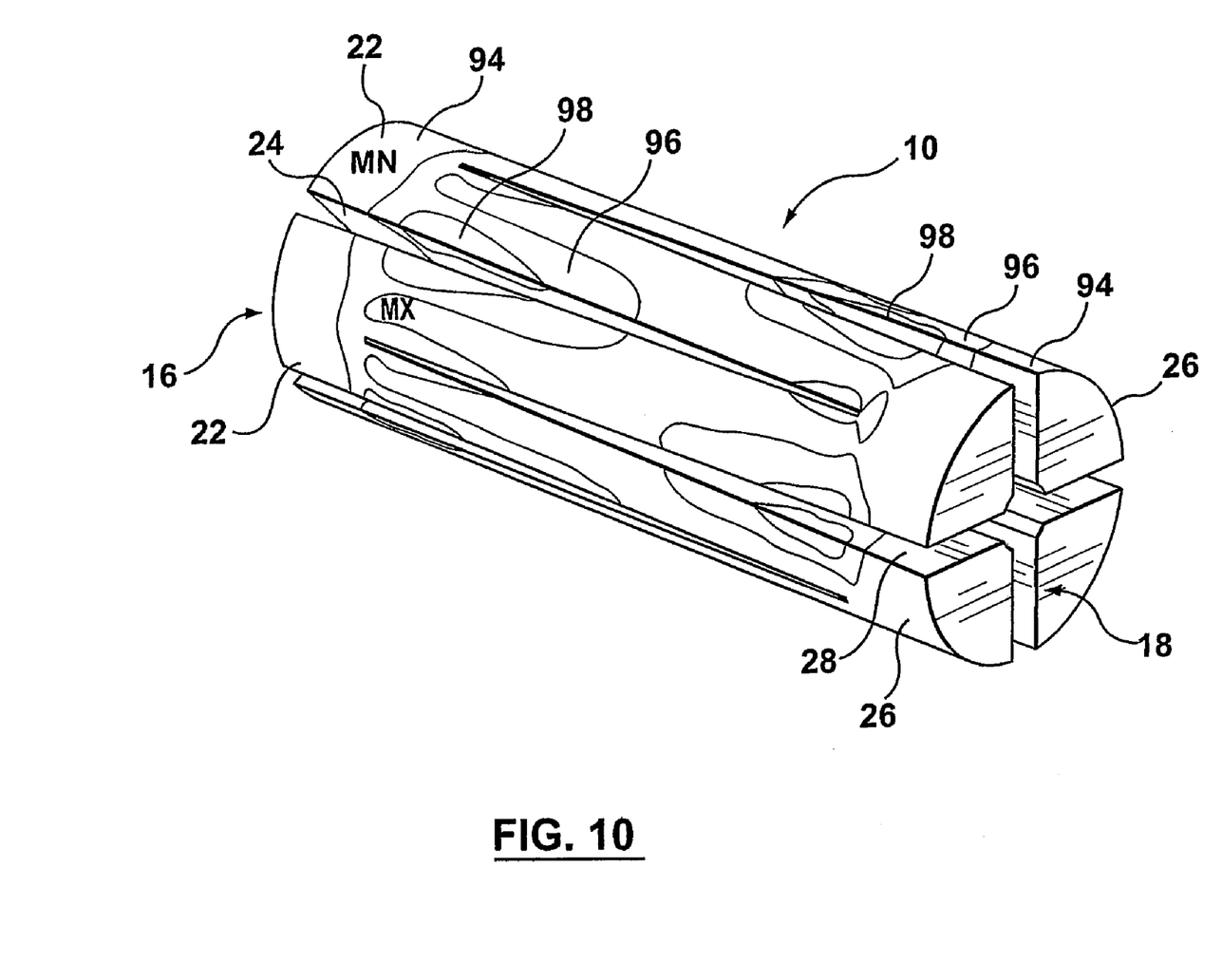
FIG. 10 is a perspective view of stresses and strains incurred by the connector shown in FIG. 1 after receiving optic fibres.

Reference is made to FIG. 10, which illustrates the stress distribution that exists in the connector 10 upon receiving a pair of optic fibres therein (not shown). While the stress distribution in the connector 10 is, in fact, non-discrete, FIG. 10 shows discrete regions having ranges of stresses, to illustrate generally the stress distribution. Areas of relatively lower stresses are shown at 94. Regions of relatively greater stress are shown at 96. Regions of greatest stress are shown at 98. It can be seen from FIG. 10 that the the stress varies along the length of the connector 10. The stress that occurs in the connector 10 when fibres are inserted therein, depends on the number and position of the slots 24 and 28.

The variable progression of stress along the length of the connector 10 allows a sequence of alignment, compression and clamping to be exerted on the optic fibres. When the fibres are first inserted into the connector 10, the ends of the fibres are maintained in alignment with each other by virtue of the size of the fibre conduit 20 in the region of the connector 10 where the ends of the fibres meet. Once the external forces that hold the connector 10 in the open position are removed, the connector 10 is permitted to relax around the fibres. As the connector relaxes, the connector 10 imparts a longitudinally compressive force on the fibres, pushing the ends of the fibres together. Furthermore, during the relaxing of the connector 10, the ends 16 and 18 of the connector 10 apply a clamping force to the fibres to retain the fibres in position and in compression against each other. The compression and the clamping forces on the fibres will be at least in part controlled by the size, the number and the position of the slots 24 and 28. The connector 10 is configured so that these forces are low enough to prevent damage to the fibres.

It will be appreciated that the above description regarding the stress distribution and the sequence of operations whereby the optic fibres are aligned, compressed and clamped applies generally to the connector 40 (FIG. 4). In other words, the connector 40 incurs increased stresses proximate its ends when holding fibres. The compression and clamping that occurs on the fibres however, is enhanced with the connector 40, relative to the connector 10, because of the presence of the accordion portions 42.

While the above description constitutes the preferred embodiments, it will be appreciated that the present invention is susceptible to modification and change without departing from the fair meaning of the accompanying claims.

The invention claimed is:

1. A connector for mechanically connecting and optically coupling two optical fiber ends, the connector comprising:
   a longitudinal body made of a shape memory alloy; and
   a fiber conduit in said body for holding said two fiber ends and confining said fibers to be in end to end alignment in said conduit with sufficient direct inward radial pressure exerted from said conduit on each one of said fiber ends to ensure centering within said fiber conduit and provide said optical coupling without risking damage to a silica core of said fiber ends, the fiber conduit at least partially radially extending to a circumference of the longitudinal body;
   wherein said fiber conduit is enlarged within elastic limit of the longitudinal body under mechanical deformation of the conduit from the circumference of the longitudinal body to allow for insertion of said fibers in said conduit, and upon release of said mechanical deformation, said connector is adapted to mechanically controllably directly release said pressure on said fibers to hold said fiber ends in said optical coupling.

2. The connector as defined in claim 1, wherein said connector is adapted to hold one of said fiber ends while another of said fibers ends is free to be positioned in said fiber conduit.

3. The connector as defined in claim 1, wherein said body is divided into a plurality of fingers that extend longitudinally from at least one end of said body.

4. The connector as defined in claim 2, wherein said body is divided into a plurality of fingers that extend longitudinally from at least one end of said body.

5. A method for mechanically connecting and optically coupling two optical fiber ends, the method comprising:
   providing a longitudinal body made of a shape memory alloy having a fiber conduit at least partially radially extending to a circumference of the longitudinal body;
   mechanically enlarging said conduit from the circumference of the longitudinal body;
   inserting one of said fiber ends into said conduit, said one of said fiber ends occupying a first end of said conduit;
   inserting with said conduit another of said fiber ends into said conduit from a second end of said conduit to abut said one of said fiber ends to achieve optical coupling between said fiber ends;
   releasing said mechanical enlarging of said conduit to directly grip said fiber ends in said body for holding said two fiber ends and confining said fibers to be in end to end alignment in said conduit with sufficient inward radial pressure exerted from said conduit on each one of said fiber ends to ensure centering within said fiber conduit to provide said optical coupling without risking damage to a silica core of said fiber ends.

6. The method as defined in claim 5, wherein said first end of said conduit is relaxed to grip said one of said fiber ends while said second fiber end is inserted from said second end.

7. The method as defined in claim 6, further comprising:
mechanically enlarging at least said first end of said conduit;
removing or repositioning of said one of said fiber ends to provide said optical coupling; and
releasing said mechanical enlarging of said conduit to grip said fiber ends.

* * * * *